United States Patent
Feldmeier et al.

[11] Patent Number: 6,048,558
[45] Date of Patent: Apr. 11, 2000

[54] METHOD OF PACKAGING REFRIGERATED MEAL IN A PACKAGE CONTAINING AN ANTI-FOG AGENT

[75] Inventors: Daniel R. Feldmeier, Waunakee; Reggie Finn, Rio; Mark R. Barrett, Madison, all of Wis.

[73] Assignee: Kraft Foods, Inc., Northfield, Ill.

[21] Appl. No.: 09/170,521

[22] Filed: Oct. 13, 1998

Related U.S. Application Data

[63] Continuation-in-part of application No. 08/678,905, Jul. 12, 1996.

[51] Int. Cl.⁷ .................................................. A21D 15/00
[52] U.S. Cl. ...................... 426/120; 426/20; 426/106; 426/112; 426/115; 426/119; 426/128; 426/549; 206/541; 206/542; 206/564; 523/169
[58] Field of Search ............... 426/20, 106, 112, 426/115, 119, 120, 128, 549, 392, 393, 396, 321, 323, 324; 206/541, 542, 564; 523/169

[56] References Cited

U.S. PATENT DOCUMENTS

| | | | |
|---|---|---|---|
| 2,236,641 | 4/1941 | Karmen | 426/120 |
| 2,561,010 | 7/1951 | Carson | 523/169 X |
| 2,615,810 | 10/1952 | Stone | 99/91 |
| 3,382,078 | 5/1968 | De Mello et al. | 99/171 |
| 3,479,308 | 11/1969 | Gattenby et al. | 260/23 |
| 3,498,962 | 3/1970 | Bruno | 260/93.7 |
| 3,515,579 | 6/1970 | Shephard et al. | 523/169 X |
| 3,541,040 | 11/1970 | Edisha et al. | 523/169 |
| 3,542,713 | 11/1970 | Gillio-Tos et al. | 523/169 X |
| 3,935,367 | 1/1976 | Merrill et al. | 428/336 |
| 3,950,289 | 4/1976 | D'Amato et al. | 260/23 X |
| 4,051,266 | 9/1977 | Goltsos | 426/120 |
| 4,066,811 | 1/1978 | Naito et al. | 426/415 X |
| 4,314,650 | 2/1982 | Cillario | 426/115 X |
| 4,341,825 | 7/1982 | Kemski | 426/129 X |
| 4,361,227 | 11/1982 | Paulucci | 426/120 |
| 4,486,552 | 12/1984 | Niemann | 523/169 |
| 4,565,738 | 1/1986 | Purdy | 428/349 |
| 4,813,543 | 3/1989 | Goldberg | 426/128 X |
| 4,835,194 | 5/1989 | Bright et al. | 523/169 |
| 4,876,146 | 10/1989 | Isaka et al. | 428/347 |
| 4,956,209 | 9/1990 | Isaka et al. | 426/106 X |
| 5,064,698 | 11/1991 | Courtright et al. | 426/127 X |
| 5,119,940 | 6/1992 | Grindrod | 426/119 X |
| 5,123,527 | 6/1992 | Hustad | 426/119 X |
| 5,134,021 | 7/1992 | Hosono et al. | 523/169 X |
| 5,167,973 | 12/1992 | Snyder | 426/120 X |
| 5,180,760 | 1/1993 | Oshibe et al. | 523/169 |
| 5,342,634 | 8/1994 | Murata et al. | 426/120 X |
| 5,375,701 | 12/1994 | Hustad et al. | 206/45.18 |
| 5,607,709 | 3/1997 | Fritz et al. | 426/106 |
| 5,731,020 | 3/1998 | Russo | 426/120 X |
| 5,744,205 | 4/1998 | Kawai et al. | 426/118 |
| 5,759,650 | 6/1998 | Raines et al. | 426/106 X |
| 5,814,684 | 9/1998 | Yoshioka | 523/169 |

*Primary Examiner*—Milton Cano
*Attorney, Agent, or Firm*—Cook, Alex, McFarron, Manzo, Cummings & Mehler, Ltd.

[57] ABSTRACT

A packaged meal is provided in the form of a kit arrangement which is formulated and prepared for storage under refrigerated, non-frozen conditions for extended time periods within retail store showcase coolers. The kit includes a compartmentalized, hermetically sealed package, with a refrigerated baked flour-containing component or dough component within an overpouch which is sealed or unsealed and positioned within one of the compartments and being specially formulated to maintain its freshness and retarding staling during extended refrigerated storage within the hermetically sealed package. At least the compartment within which baked component is sealed has an anti-fogging agent component which further assists in maintaining freshness and retarding staling under even refrigerated, non-frozen conditions.

12 Claims, 3 Drawing Sheets

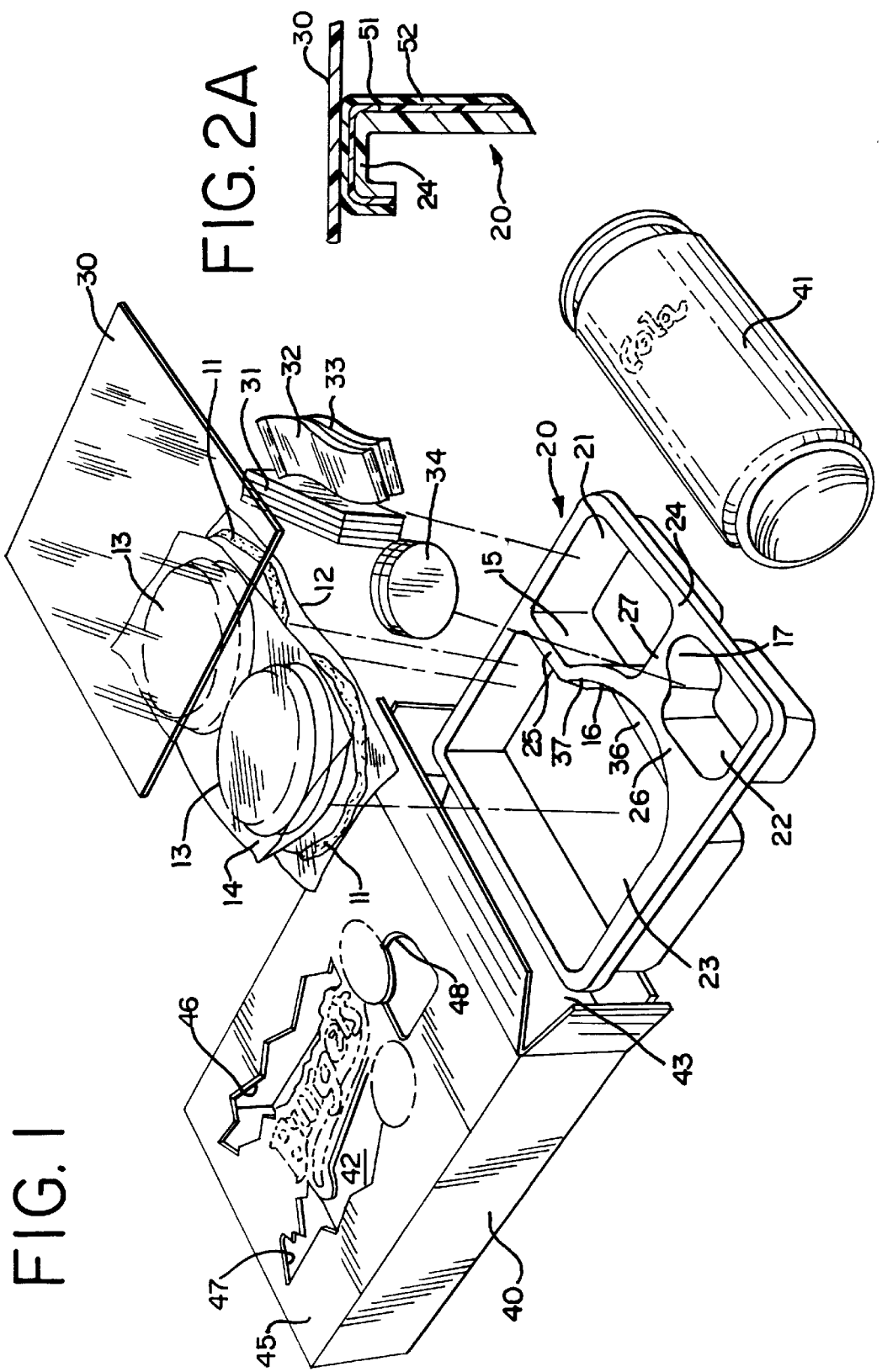

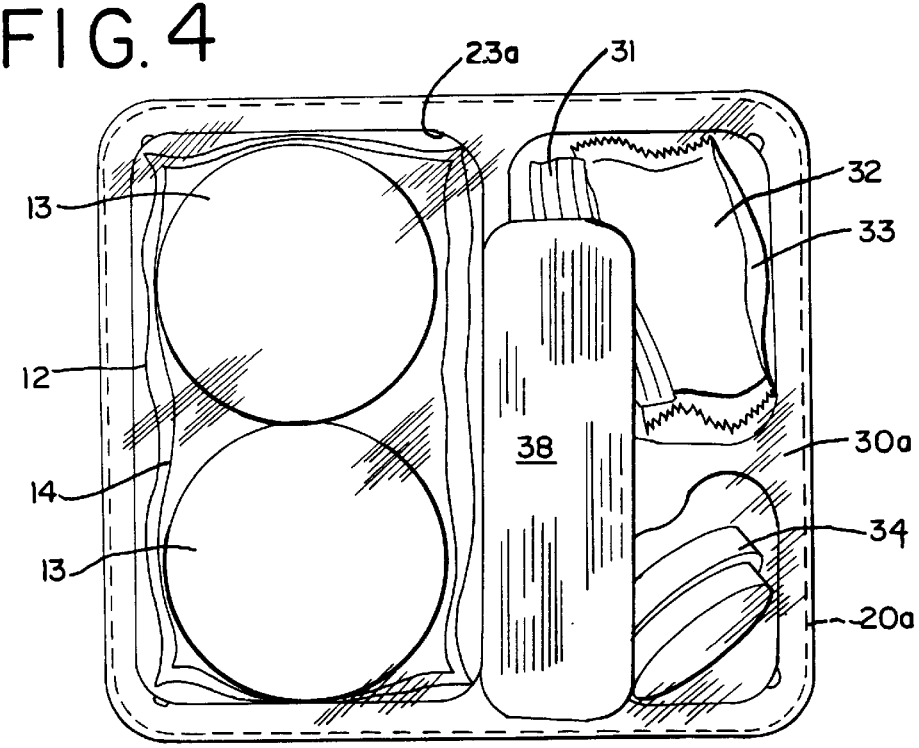
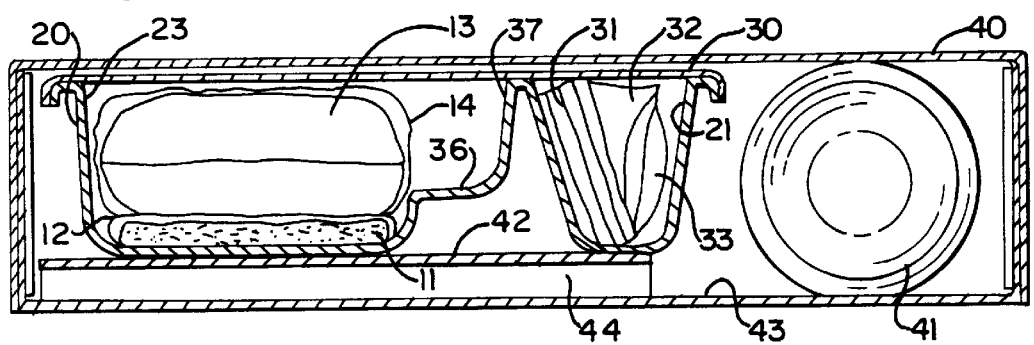
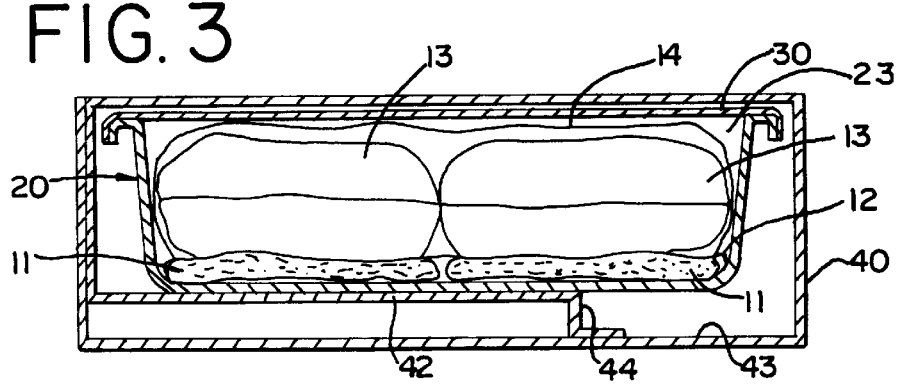

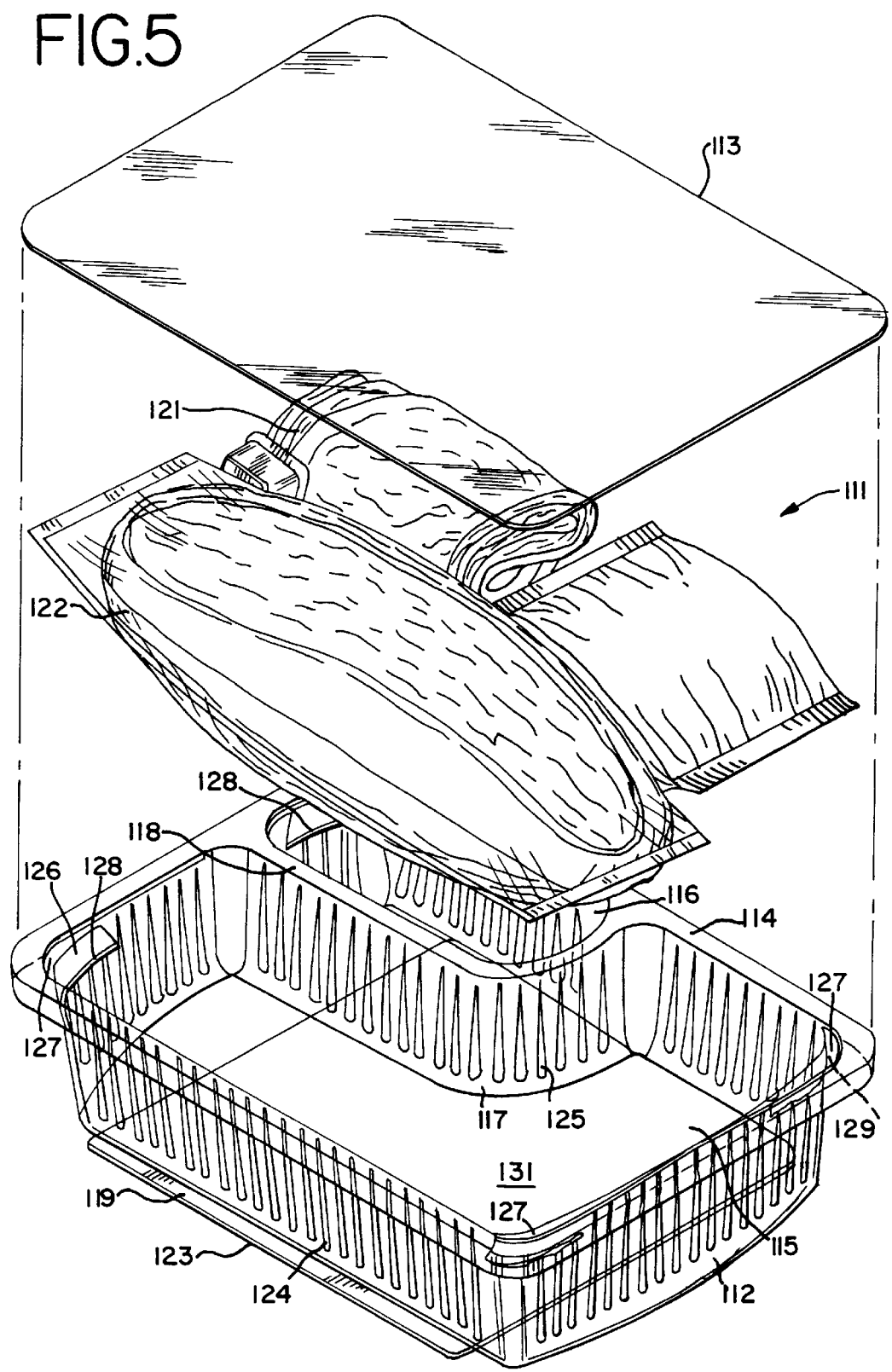

METHOD OF PACKAGING REFRIGERATED MEAL IN A PACKAGE CONTAINING AN ANTI-FOG AGENT

CROSS REFERENCE TO RELATED APPLICATION

This is a continuation-in-part of allowed application Ser. No. 08/678,905, filed Jul 12, 1996.

DESCRIPTION

BACKGROUND AND DESCRIPTION OF THE INVENTION

This invention generally relates to a refrigerated, packaged meal which includes a baked flour-containing or grain-based component. More particularly, the invention relates to meal components packaged together in a kit-like collection wherein at least some of the components will be assembled by the user after the kit or package is opened to remove these contents from the package. Baked flour-containing components such as baked dough components are incorporated which exhibit resistance to external, environmental or ambient moisture and texture degradation during storage under refrigeration while within a hermetically sealed, gas-flushed package having anti-fogging features.

Various food packages are known that contain food in a form which is visible to the purchasing consumer. Included are packaged food products which require a minimum amount of consumer preparation and are quick to assemble into a snack or meal which combines a variety of tastes into one unit, such as sandwiches which incorporate a baked grain-based component and other component(s) providing a source of meat or dairy protein, such as carved, cubed, pattied, stuffed, extruded, shredded or sliced meats, cheeses, spreads and the like. One such type of package has a rigid base tray having food-receiving compartments and a transparent flexible film cover which hermetically seals the compartments. A particular example in this regard is exemplified by U.S. Pat. No. 5,375,701, which is incorporated by reference hereinto.

Typically, these types of products are intended to be sold in retail facilities under customary refrigerated conditions. This means that all of the components within the sealed package or kit must be suitable for being refrigerated for extended time periods during storage, transportation, retail display and temporary refrigerated storage by the consumer. This requirement can be particularly problematic for any baked dough or grain-based component.

In the past, these types of sealed-package refrigerated products typically incorporate baked grain or dough components which normally have substantially low moisture levels. These tend to be in the nature of crackers or similar low-moisture types of products. Once a baked component, such as a bread or a roll, is held under refrigerated conditions for several days or more, it tends to undergo retrogradation and stale out, typically toughening or becoming leathery or dry and developing off odors and flavors. Chewing becomes more difficult, and the baked product loses some of its chewability. In addition, in packaged refrigerated meals of the type discussed herein, moisture can be picked up by the baked dough component, especially along its lower portions, even while its top portions dry out or stale.

Generally speaking, refrigeration at non-freezing temperatures negatively impacts upon the taste of a baked grain or flour product, such as a bread component in the general form of a roll. While freezing baked dough products for reasonable lengths of time actually maintains adequate freshness, refrigeration at above-freezing temperatures of typical baked grain or dough products or breads or rolls is detrimental to the desired moisture, flavor, aroma, firmness and texture of that product.

Products of the type discussed herein incorporate components that must be kept refrigerated and should not be frozen. A suitable approach for maintaining the proper freshness and taste requires that each component, both individually and when packaged with other components, be capable of storage under such refrigerated conditions without any detrimental effects. In this regard, consideration is to be given to migration of moisture, aromas and flavors among the various components, as well as any other negative impact of refrigeration upon the individual components due to non-freezing refrigerated conditions for extended time periods of several weeks.

SUMMARY OF THE INVENTION

In accordance with the present invention, it has been determined that a unitary package or kit which is a refrigerated, packaged meal can be provided by combining various components of food and packaging to provide a compact, easily transportable sealed package or component kit which includes a compartmentalized hermetically sealed package having a plurality of components hermetically sealed from each other and from the environment. This package contains multiple components which are particularly well-suited for refrigerated storage under the conditions of hermetically sealed packaging. The food components include a refrigerated baked component which is baked from a dough or batter which contains flour and/or grain, such as a sandwich roll, bun, crust, pancake, waffle and the like, that exhibits resistance to staling and to take up of ambient moisture as well as to texture, flavor, aroma and microbial degradation during refrigerated storage. Such baked component is positioned within a pouch or bag, and the package within which same and the other food component(s) are sealed includes a rigid or semi-rigid tray containing an anti-fogging agent. A flexible lid releasably sealed to the tray typically also includes an anti-fogging agent.

It is accordingly a general object of the present invention to provide an improved refrigerated, packaged meal which can be stored under refrigerated conditions without substantial deterioration of a baked component for commercially useful lengths of time.

Another object of this invention is to provide an improved packaged meal product which includes a baked component which is formulated to exhibit resistance to staling and moisture take up, and to texture, flavor, aroma and microbial degradation during storage at refrigerated temperatures within a hermetically sealed, gas-flushed environment under the influence of an anti-fogging agent.

Another object of the present invention is to provide an improved refrigerated, packaged meal which incorporates a plurality of edible components for a meal and which includes components to be assembled in sandwich fashion between a specially formulated baked component.

Another object of the present invention is to provide an improved refrigerated, packaged meal in ready-to-assemble form, certain components forming a sandwich-type product which can be consumed in a refrigerated or heated condition, as well as at room temperature if desired.

Another object of this invention is to provide an improved meal product having a rigid or semi-rigid tray having an anti-fogging agent which migrates into one or more separate modified-atmosphere compartments for eliminating or retarding staleness and moisture buildup.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 1 is an exploded perspective view of a packaged meal in accordance with the invention;

FIG. 2 is a longitudinal cross-sectional view of the packaged meal shown in FIG. 1;

FIG. 2A is a detailed, enlarged cross-sectional view of the tray component of FIG. 2;

FIG. 3 is a transverse cross-sectional view of the package shown in FIG. 1;

FIG. 4 is a top, plan view of another embodiment of the kit; and

FIG. 5 is an exploded perspective view of a further embodiment of a packaged meal.

DETAILED DESCRIPTION OF THE INVENTION

In the embodiment illustrated in FIGS. 1, 2 and 3, precooked meat components 11 such as meat patties are hermetically sealed under vacuum within a vacuum pouch 12 of oxygen-barrier film which provides a vacuum-pulled envelope in which the meat components are packaged within an environment which significantly reduces oxygen which otherwise could negatively impact the meat components.

Also illustrated are a plurality of baked components 13, such as buns, rolls, biscuits, muffins, pizza crusts, pancakes, waffles, and the like. These baked components include flour or grain products and are shelf stable under refrigerated conditions (about 40° F.) for at least 60 days. When packaged as described herein, longer shelf lives will be attained to retard staling and off-flavors. Baked components 13 are hermetically sealed within a gas-flushed film container 20.

Baked components 13 also preferably are in their own film pocket, which can be sealed, such as the illustrated overwrap or pouch 14. Pouch 14 is a polymer bag which provides barrier properties for the baked components, which are enclosed therewithin. Typically, pouch 14 will be transparent or translucent.

Referring now to the illustrated food package containing the components for a ready-to-eat or ready-to-assemble precooked meat sandwich, this food package includes a rigid or semi-rigid base tray 20 having a plurality of recessed compartments and a top 30 which can be fitted to base tray 20 and sealed thereto as illustrated in FIGS. 2, 3 and 4. Typical sealing is by the application of heat in accordance with generally known procedures. Base tray 20 of FIGS. 1, 2 and 3 includes a plurality of compartments 21, 22 and 23, separated by internal flanges 15, 16 and 17 in order to thereby contain the components of the meal kit and to separate selected components from one another, as desired.

Base tray 20 is of a so-called rigid or semi-rigid type. The materials are typically polymeric, and they exhibit stiffness, but are not too stiff so they could be easily damaged or dented during handling. The materials also must satisfy the basic function of preserving the quality of the food products by minimizing any transference when in a hermetically sealed condition. High impact polystyrene and high density polyethylene have been found to be suitable components of multi-layer coextrusions. Specific examples include a six-layer coextrusion, the bulk of which is high impact polystyrene, and a multi-layer coextrusion having inner and outer layers of low density polyethylene. One or more inner layers enhance oxygen barrier characteristics. Ethylene vinyl alcohol or polyvinylidene chloride are suitable oxygen-barrier materials. Ethylene vinyl acetate, for example, also can form an inner layer. In a specific example, the coextrusion polymers will be high impact polystyrene, about 5 weight percent vinyl acetate, and about 2 weight percent of anti-fogging agent as discussed herein.

In an important aspect of the invention, the base tray 20 includes a layer of anti-fogging agent. The chemical make-up of such anti-fogging agents are known in the art and are commercially available from a variety of sources. Preferably, the anti-fogging agent is incorporated within the rigid or semi-rigid base tray 20 in a manner such that the anti-fogging agent migrates to the surface at the interior of the tray. The anti-fogging agent thus enters the compartments in a time-release fashion. In a sense, the anti-fogging agent gradually blooms onto the internal surface of the tray. This can be accomplished, for example, by having the anti-fogging agent as a layer 51 under a sealant layer 52 on the interior surface of the tray. This sealant layer 52 facilitates assembly of the top 30 onto the tray 20, such as along its perimeter top edge 24.

In addition to the precooked meat components 11 and their vacuum pouch 12 and the baked components 13 and their container 14, other components of the meal kit are illustrated. These include cheese slices 31, condiments 32 and 33, such as relish, mustard, ketchup, formulated sauce and the like. Typically, these components would be assembled by the consumer, together with one or more of the precooked shaped meat components 11 and baked components 13 into a sandwich meal. If desired, this sandwich meal can be consumed in its refrigerated or a non-reheated condition. Alternatively, the assembled sandwich can be reheated in a microwave oven or the like. Also illustrated is a treat or dessert component 34, such as wrapped candies.

It will be noted that each of the food components is separately compartmentalized, separately wrapped and/or separately hermetically sealed. This helps to insure that there is no flavor transfer or other undesired transfer such as moisture and particulates between or among the individual components. Each compartment is sealed from the other by virtue of the internal flanges 15, 16, 17 which extend the entire height of each respective compartment. Another element of this separate packaging feature is having the top sheet 30 hermetically sealed to the periphery and internal flanges of the base tray 20. In the illustrated embodiments, the peripheral seal is along perimeter top edge 24 and flange top edges 25, 26 and 27. Top sheet 30 is airtightly sealed to these edges 24, 25, 26 and 27 with a hermetic and peelable seal. The package as sealed is preferably gas flushed. Individual components could be gas flushed or vacuum sealed and placed in the base tray during forming or assembly of the kit. Further details of this type of package are found in U.S. Pat. No. 5,747,084, the disclosure of which is incorporated hereinto.

Top 30 is preferably a sheet made of a transparent flexible film material. This film material preferably has the ability to be printed upon to the extent desired. Printing directly onto the top 30 is especially desirable in an embodiment such as illustrated in FIG. 4, which does not include exterior packaging such as that shown in the embodiment of FIGS. 1, 2, and 3. As can be seen in FIG. 4, top sheet 30a includes a label portion 38 having indicia printed thereupon. This printing can be directly onto the sheet itself or can be an initially separate label which is adhered onto the sheet. Any such label can include text and graphics, required labeling information, and the like.

With further reference to the top 30, it is preferably a flexible film sheet cover. Polyester materials can be especially useful for this top or cover because they are relatively strong and can accept ink or labels quite well. Multi-layer films also are possible, such as including an oxygen barrier middle layer including materials such as ethylene vinyl alcohol and polyvinylidene dichloride. A particularly useful interior layer is low density polyethylene which is heat sealable and provides a moisture barrier and can accept an anti-fogging agent.

It has been determined that the combination of the presence of the anti-fogging agent within the tray 20, the anti-fogging agent within the top or cover 30, and the overwrap or pouch 14 within which the baked dough component is sealed combine to accomplish the important objectives of the invention. More specifically, this combination of features has been found to avoid staleness and general deterioration of the baked component when the meal according to the invention is stored under refrigerated conditions. It has been found that this combination of features is particularly useful in avoiding a situation which is often encountered when baked products, even those which are hermetically sealed under gas-flushed conditions, deteriorate when stored for several days within retail refrigerated cases.

Products of this type have been found to be susceptible to deterioration especially when subjected to temperature gradients and fluctuations, which are especially prevalent at the access side (usually the front) of a refrigerated food retail display case. Deterioration in this regard includes hardness at the top portion of the baked component and sogginess at the bottom portions of the baked component. The baked components can also have a dry texture and be firm/hard/tough, typical characteristics of staling baked products. In those baked products which are partially sliced so as to have a hinge edge, there is a tendency to develop deterioration at the hinge, such as a drier hinge edge. These types of problems are addressed by the combination in accordance with the invention. The anti-fogging agents cooperate to change the surface tension of the inside surface of the package. Droplets do not form on the lid or in the tray. Any condensing moisture is spread, allowing for easier evaporation of the moisture.

With reference to the base tray 20 which is illustrated in FIGS. 1, 2 and 3, the compartment 23 is illustrated as including a shelf 36. When provided, shelf 36 allows additional volume for conveniently accommodating food components. If desired, the surface of the shelf 36 which is generally parallel to the top 30 can provide support for a particular food component. This can be accompanied by a particular shape of the indent area 37 defined in part by the vertical wall of the internal flange 16 of the compartment 23. For example, indent area 37 can be shaped to accommodate oversized baked components 13, which can then rest upon the shelf 36, while other portions of the baked components rest upon the precooked meat components below at least a portion of the baked components and resting within the compartment 23. As can be seen in the illustrated embodiment, the baked components can be sized so their volume is accommodated by the compartment 23 without requiring the additional volume provided by the space defined by the shelf 36 and the indent area 37. In the FIG. 4 embodiment, for example, the compartment 23a of base tray 20a does not incorporate any such shelf structure, and this compartment 23a more closely conforms to the overall shape of the baked dough components within their gas flushed film container 14. In this illustrated embodiment, this overall shape generally continues for the precooked shaped meat components within their vacuum pouch 12.

The embodiment illustrated in FIGS. 1, 2 and 3 includes an outer carton 40, which is sized and shaped to accommodate the base tray 20. In this illustrated embodiment, the outer carton also is sized and shaped to accommodate another meal component, which can be a side item such as a bag of chips, or a containerized drink, for example. Illustrated in this regard is a carbonated soft drink within a generally rigid container 41 such as a metal can. A drink, such as a non-carbonated juice-type drink could instead be provided, for example, in a soft-sided pouch. Accordingly, the embodiment of FIGS. 1, 2 and 3 provides a meal which is more complete than that of FIG. 4.

In the illustrated embodiment, the outer carton 40 has a depth which is sized to accommodate the generally rigid drink container 41. This depth is greater than needed to accommodate the depth of the illustrated base tray 20. When this size relationship exists, a platform 42 can be included along a portion of the bottom panel 43 of the outer carton 40. Platform 42 includes a sidewall 44 having a height adequate to properly "face" the top 30 with respect to a top panel 45 of the outer carton 40. In this manner, the food components and/or any labeling information with respect to the top 30 are more readily visible through openings of the top panel 45, such as those designated at 46, 47 and 48.

A further packaged meal in accordance with the present invention, generally designated as 111, is illustrated in FIG. 5. Included is a generally rigid base tray 112. An oxygen-barrier flexible film cover 113 is shown hermetically sealed along a peripheral flange 114 of the rigid base tray 112. Various food components are hermetically sealed within compartments defined by the base tray 112 and the film cover 113.

Rigid base tray 112 includes a plurality of compartments. Large compartment 115 and a smaller compartment 116 are shown in the illustrated embodiment. An internal component wall 117 helps to define these compartments. Wall 117 includes an internal flange 118 which is preferably continuous with the peripheral flange 114 as illustrated. It will thus be appreciated that the flexible film cover 113 overlies and is sealed to the peripheral flange 114 and to the internal flange 118. This seals the respective compartments on an individual basis in that each such compartment is hermetically isolated from the other compartments, as well as from the environment. A back panel 119 is also shown.

A meat component 121 is illustrated in FIG. 5 positioned within the smaller compartment 116. A baked component 122 is illustrated positioned within the large compartment 115. Large compartment 115 is also illustrated as containing other food components. They can include other sandwich-making components and side components such as dessert items and the like. Side items and other sandwich components or meal components typically will be individually wrapped. The baked component 122 is individually wrapped within an overwrap or pouch 134, which has properties, characteristics and features of the pouch 14 of the other embodiments.

With more particular reference to the flexible film cover 113, same is preferably made of a transparent, flexible film or sheet material which can be printed upon as desired. This film cover is airtightly sealed to the periphery and flanges of the base tray 112. Sealing can be by heat sealing, suitable adhesives and the like. During the course of the sealing operation, the package as sealed is gas-flushed in accordance with generally known techniques. Various ones of the components will be separately packaged under gas-flushing or vacuum sealing conditions before being placed in the base tray.

When provided, the back panel 119 is a relatively stiff panel which preferably overlies at least a portion of both of the compartments and is adhered thereto by suitable means such as a hot melt adhesive. The lower edge 123 of this back panel is located along a line directly behind the outermost edge of the lowermost peripheral flange which is generally parallel to and most closely spaced from the lower edge 123. In this manner, the lower edge of the panel along with the other edge of the lowermost peripheral flange together provide a pair of parallel edges on which the package can stand with relative stability.

It is to be understood that the flexible film cover 113 can be used to provide labelling information and transparent areas for viewing of the food components and in accordance with various suitable arrangements. Typically it will be desired to have most, if not all, of the food components visible through transparent portions of the film cover which are between the labeling information areas. Labeling information can also be provided on the back panel.

Rigid base tray 112 may include vertical ribs 124, 125. These assist in preventing buckling of the wall portions of the compartments 115 and 116, including their internal walls. At certain locations, most notably in corner locations, the ribs can be interrupted by a curved flattened surface 126. Surface 126 extends from a recessed top portion 127 and a curved ledge 128 which is generally parallel to the recessed top portion 127. This curved flattened surface 126 and curved ledge 128 combine to form an indent within the package and a corresponding detent 129 on the exterior of the rigid base tray. These detent structures avoid undue deflection of the rigid base tray and enhance buckling resistance. In the illustrated embodiment, the sidewalls of the rigid base tray 112 are offset by about 3° from true vertical, thereby providing a 3° taper generally between the peripheral flange 114 and the bottom wall 131 of the tray. The curved flattened surface 126 provides a backward sloping stacking lug structure. This difference in taper angles facilitates the formation of the curved ledge 128.

The baked component 13, 122 preferably is specially formulated so as to contribute to shelf-life and freshness when combined with its pouch and anti-fog agent of the barrier package in accordance with the present invention. This advantage occurs even when the baked component is refrigerated. The baked components, which contain flour made from grain and are thus flour-containing, typically will take the form of a bread roll such as a so-called submarine roll or hoagie roll, a hard roll, a soft bun such as a so-called hamburger bun or hot dog bun, or a crust such as a pizza-type crust, or other flour-containing components such as pancakes or waffles.

In accordance with the present invention, acceptable taste, texture and appearance properties are maintained in the baked component 13, 122 for extended time periods. For example, these properties are maintained when the packaged product is stored under refrigerated conditions (at approximately 40° F. or about 4° C.) for several weeks. A typical range of refrigeration temperatures is between above 0° C. and about 10° C. In other words, the roll component or the like is especially formulated for extended refrigerated shelf life. The baked component is also of a type which will not be detrimentally affected during refrigerated distribution, storage and display under refrigerated conditions, and same is suitable for being consumed in an unheated or heated condition.

One aspect of baked flour-containing components in general is that refrigeration under non-freezing conditions can promote staleness, drying, and undesirable flavors, odors and coloration. For example, starch in baked components is known to "stale out" faster under such refrigerated conditions when compared with room temperature conditions, or for that matter frozen conditions. Stale products typically have a firmer crumb and are drier to the taste than desired. Retrogradation of starch and crumb-firming occur more rapidly under refrigerated conditions, and the starch crystallizes into irreversible crystal form. A product that is much too firm and even gritty is a typical characteristic of a baked flour-containing product which has undergone such staling.

An especially difficult situation for maintaining freshness and extended shelf-life of baked products is encountered in the environment which products such as those according to the present invention are displayed for retail sale. A typical refrigerated food case has a front access so that the consumer may easily select the refrigerated packaged meal. These refrigerated display cases either are fully open at the front or have glass doors which are opened frequently during store operation. It has been observed that these types of refrigerated display cases cannot maintain fully consistent temperatures within the case itself (especially from front to back) and throughout its hours of operation.

Although a typical refrigerated food case has an efficient cool air circulation system, it is especially difficult to maintain the same cool temperature at the very front edge of the case when compared with the more enclosed portions of the case. Thus, the front-faced refrigerated packaged meal will be susceptible to a somewhat higher temperature than a packaged meal in other locations within a particular refrigerated display case. In addition, this temperature can fluctuate as packages are handled by consumers and/or as glass doors are opened and closed and/or as the overall temperature within the store fluctuates. Furthermore, these refrigerated food cases are generally self-defrosting, and they typically cycle to an elevated defrosting temperature at least once, often about three times, within any given twenty-four hour period. It will thus be appreciated that, when considering retardation of the onset of staleness and/or sogginess and the maintenance of shelf-life and freshness over a commercially acceptable number of days, the uneven and somewhat abusive real-world conditions to which these products will be subjected must be taken into consideration.

The present invention addresses these concerns by combining packaging features with the formulation for the baked product. Packaging features include the inclusion of the anti-fogging agent within the tray component and preferably also within the lid component. Also included in the preferred combination is the provision of the overwrap or pouch for each of the baked components within the refrigerated packaged meal. Multiple baked components can be included within the same pouch, as desired.

Formulations for making up the baked component are discussed herein in terms of so-called baker's percentages. These are weight percents based on the weight of flour used in a specific recipe, generally per 100 pounds of flour. For example, when 100 pounds of flour are used in a recipe, 57% water would mean the addition of 57 pounds of water to 100 pounds of flour. It should be noted that, when baker's percentages are used, the total percentages do not necessarily equal 100%.

A basic recipe (in baker's percentages) for bread roll type baked components prepared according to the invention will be as follows: 100 pounds flour, 60–70% water, 1–5% shortening, 1–5% wheat gluten, 2–3% yeast, 0.1–0.5 starch-degrading enzyme, 0.1–0.4 gum and 0 to 2% egg white solids. Other ingredients can include 0.5–3% monoglycerides and/or mono- and di-glycerides, 0.5–12% corn syrup and the like, 0.2–0.8% vinegar, and other components for flavoring, coloring and/or texturizing the baked component.

In these formulations, the starch-degrading enzyme is preferably an exoamylase, such as α-amylase derived from various Bacillus strains. This component, together with other components, especially the gluten component, greatly contribute to the advantageous properties of the invention with respect to the baked component. Other ingredients important in this regard are the gum component and the corn syrup components. It can also be useful to omit the egg white solids.

With further reference to the starch-degrading enzyme, preferred among the possible enzymes are the maltogenic enzymes which are resistant to inactivation by heat up to temperatures of at least about 82° C. One such enzyme is identified by the trademark NOVAMYL, a recombinant maltogenic amylase having an exemplified activity of 1500 MANU/g. A specific example is Novo Nordisk 1500 mg.

Typically, the flour-containing dough is processed in stages. One component is allowed to ferment, such as for from four to six hours for a sponge formulation for a multigrain formula and a French sour starter for a sourdough formula. Such is combined with the rest of the formulation at an appropriate time and under appropriate conditions as is generally known in the art. Typically, the dough is held under conditions of temperature and humidity for a time effective to develop the dough as indicated by the evolution of carbon dioxide and the degradation of at least a portion of the starch in the flour to oligo saccharides. Forming and baking of the dough then follows, after which the resulting baked component is ready to be included in the packaged meal as discussed herein, either promptly or after storage under frozen conditions, depending upon the particular manufacturing needs at the time.

The types of enzymes discussed herein hydrolyse the non-reducing terminal chain lengths of starches and other polysaccharides by cleaving mono- and oligo-saccharide units at the (1–4) α-glucosidic linkages. It is preferred to employ greater-than-normal quantities of monoglycerides and/or mono- and di-glycerides in combination with the enzyme. The glycerides are useful in providing additional water binding in the crumb. Preferred levels of these water binders can be between about 0.5 to about 1.5%.

In addition to the starch-degrading enzyme, it has been found that other formula modifications are useful. For example, the inclusion of gluten, preferably as vital wheat gluten, can provide beneficial effects with respect to shelf life and retarding staleness. The preferred compositions will contain from about 1 to about 2% added gluten. In addition to these structural components, gums such as vegetable gums like guar and xanthan, alone or in combination, can be effective in improving the long-term texture of the crumb.

Exemplary illustrations of the disclosure herein are provided by the following examples.

EXAMPLE 1

A baked flour-containing component taking the form of a sourdough sub roll is prepared in a two-component formula. One component is a French sour starter including (in baker's percentage) 2.5% clear flour, 1.35% water and 0.67% starter. This proceeds through a six hour fermentation. At the appropriate time, same is combined with the rest of the sourdough formula including 100% flour, 2.28% vital wheat gluten, 2.5% yeast, 1.7% salt, 1.05% mono- and di-glycerides, 0.48% calcium propionate anti-microbial agent, 0.48% of 200 grain vinegar, 1.50% shortening, 1.8% corn syrup, 63.85% water, 0.67% of the French sour starter, 0.32% Novo Nordisk 1500 mg NOVAMYL enzyme and 0.22% guar gum. Mixing and combining is conducted in accordance with normal procedures. Sub roll-shaped preforms are proofed as required and baked.

Resulting baked sub rolls are incorporated into a packaged meal as shown in FIG. 5, containing anti-fogging agent and being gas-flushed and hermetically sealed as described. In a specific packaged meal kit, a thus baked sub roll (approximately 6 inches in length) is inserted into the overwrap or pouch. This wrapped roll and other components are inserted into the large compartment of the rigid base tray. Illustrated other wrapped components include fat free sharp cheddar cheese, honey dijon spread and reduced fat cream sandwich cookies. Fat free oven roasted and smoked turkey is hermetically sealed within the smaller compartment of the rigid base tray. The kit is refrigerated at 40° F. for consumption at approximately this temperature or higher. Refrigerated storage aspects include placing a plurality of the packaged food kits within a commercial refrigerated packaged food display case and subjecting the kits to temperature, air flow and light fluctuations which are characteristic of the display case.

EXAMPLE 2

A multigrain flour-containing formula is used to make hoagie rolls, each being about six inches in length. The sponge component, which is subjected to four hours of fermentation, includes 50% flour, 40.25% water, 13% nine grain mix, 2.54% yeast, 1.5% vital wheat gluten, 1.05% monoglycerides and 0.5% yeast food. Under appropriate timing, temperature and environment conditions, the sponge is combined with a dough formulation of 50% flour, 23% water, 11.5% high fructose corn syrup, 3% shortening, 2% nonfat dry milk, 0.5% 200 grain vinegar, 0.32% NOVAMYL enzyme, 0.22% guar gum, and flavoring and consistency modifiers. After suitable baking, a multigrain hoagie roll is combined into a packaged meal kit as described in Example 1.

Another multigrain hoagie roll is included in another variety of the kit, which also includes smoked cooked ham and oven roasted turkey in the smaller compartment, with cheddar cheese, light mayonnaise and chocolate chip cookies being packaged with a hoagie roll in the large compartment. Evacuation and gas flushing and hermetic sealing are carried out.

In another variety of the kit, one of the six inch rolls is packaged in a large compartment with Swiss cheese, light mayonnaise and a brownie, while smoked turkey and oven roasted chicken are hermetically sealed within the packaged kit as discussed.

Each kit is refrigerated at 40° F. for subsequent distribution, retail display and use at approximately this temperature, taking into consideration the fluctuating conditions previously noted.

EXAMPLE 3

Kits were assembled as generally shown in FIGS. 1–3. Baked flour-containing components in the form of two small-sized hamburger buns were formulated as discussed herein, baked and sealed within a polymer bag. This baked product, together with other food components, as generally shown in FIG. 1, were inserted into respective compartments within the tray. The tray had an anti-fogging agent layer immediately below a sealant layer which covered the internal surfaces of the tray. An anti-fogging agent containing flexible film top or lid was releasably sealed to the flange of the filled tray. The resulting tray was boxed within the illustrated container.

The thus assembled kit was stored under conditions experienced in commercial refrigerated food display cases or showcase coolers. After storage for at least typical storage life time periods, evaluations indicated that the hamburger buns maintained acceptable freshness while packaged within the environment of the kit. Substantially the same results were observed for kits having hot dog buns as the baked flour-containing component.

It will be understood that the embodiments of the present invention which have been described are illustrative of some of the applications of the principles of the present invention. Numerous modifications may be made by those skilled in the art without departing from the true spirit and scope of the invention.

We claim:

1. A method of imparting resistance to moisture and texture degradation in a baked flour-containing content of a package during periods of extended storage at refrigerated temperatures, comprising:

providing a package having a compartment with an anti-fogging agent associated therewith;

positioning the baked flour-containing content in said compartment;

hermetically sealing the baked flour-containing content in said compartment;

distributing said anti-fogging agent in said compartment; and refrigerating said package with said baked flour-containing content therein at a temperature of between about 0° C. and about 10° C. for a time period required for retail distribution, display and sale of said baked flour-containing content.

2. The method of claim 1, wherein said refrigerated baked flour-containing content is enclosed within an overwrap pouch.

3. The method of claim 1, wherein said package is formed of a plurality of layers, including a support layer and a sealant layer, said sealant layer being adjacent said compartment, and said anti-fogging agent is between said sealant layer and said support layer, which anti-fogging agent migrates to said compartment over time.

4. The method of claim 1, wherein said baked flour-containing content is hermetically sealed in said package with an oxygen-barrier flexible film.

5. The method of claim 4, wherein said oxygen-barrier flexible film includes said anti-fogging agent.

6. The method of claim 1, wherein said baked flour-containing content is formulated from a dough including a starch-degrading enzyme.

7. The method of claim 6, wherein said enzyme is an amylase.

8. The method of claim 6, wherein said baked flour-containing content further includes an added gluten component and corn syrup.

9. The method of claim 1, wherein said refrigerated baked flour-containing content is a bread roll.

10. The method of claim 1, wherein said refrigerated baked flour-containing content is a pancake or a waffle.

11. The method of claim 1, wherein said package also includes a refrigerated meat meal therein.

12. The method of claim 1, including gas flushing said package.

* * * * *